April 19, 1960 A. M. WRIGHT ET AL 2,933,130
FUEL CONTROL FOR INTERNAL COMBUSTION ENGINE
Filed May 8, 1952 2 Sheets-Sheet 1

INVENTORS
A. M. WRIGHT
J. O. NASH
BY *(signature)*
ATTORNEY

April 19, 1960  A. M. WRIGHT ET AL  2,933,130
FUEL CONTROL FOR INTERNAL COMBUSTION ENGINE
Filed May 8, 1952  2 Sheets-Sheet 2

FIG. 2

INVENTORS
A. M. WRIGHT
J. O. NASH
BY *Ann Prentis*
ATTORNEY

United States Patent Office 2,933,130
Patented Apr. 19, 1960

2,933,130
FUEL CONTROL FOR INTERNAL COMBUSTION ENGINE

Alexander M. Wright, West Hartford, and Jack O. Nash, Manchester, Conn., assignors, by mesne assignments, to Chandler-Evans Corporation, West Hartford, Conn., a corporation of Delaware Application May 8, 1952, Serial No. 286,800

10 Claims. (Cl. 158—36.4)

This invention pertains to automatic fuel and speed control apparatus for internal combustion engines and more particularly has reference to fuel and speed controls for aircraft continuous combustion engines of the gas turbine and jet types.

The invention is especially applicable to continuous combustion engines for propeller-propulsion, jet-propulsion (turbo-jet), or propeller-and-jet (prop-jet) propulsion of aircraft. Such engines usually include an air inlet, an air compressor, one or more combustion chambers, a gas turbine, and a tail pipe for discharging combustion gases to the atmosphere. Associated with these engines is a fuel system including a pump for delivering fuel to the combustion chambers. This invention concerns apparatus to control the engine speed and power by regulating the fuel supply as a function of a manual control and several variables, including engine inlet air temperature and pressure, engine speed, and other engine operating conditions.

Owing to structural and metallurgical limitations, engines of the type referred to cannot be safely operated at speeds and temperatures exceeding predetermined limiting values, but for maximum economy of operation, both engine speed and temperature must be maintained at or near these limiting values. On the other hand, while engine speed is a critical factor in flight performance of aircraft, an engine cannot be operated at maximum speed in all flight maneuvers, at all flight speeds, or under all flight conditions. Fuel control apparatus should, therefore, enable the operator to vary engine speed and power as desired from a required minimum to the predetermined limit of speed and full power.

The value of engine speed corresponding to any given value of fuel flow, varies as a function of the speed of flight, air pressure and temperature of the engine inlet air, engine air compressor characteristics and a wide variety of other factors. Also, the maximum fuel flow to a turbo-jet engine is limited by the permissible compression ratio of the air compressor that results, at any engine speed, engine inlet air temperature and pressure, from that fuel flow. Therefore, for proper regulation of engine operation, and to avoid possible engine failure, it is not feasible to rely solely upon automatic regulation of fuel flow as a function of variables which do not include the factors mentioned.

In turbo-jet engine fuel control systems heretofore in use, engine performance is controlled by regulating the fuel supply to the engine by a control apparatus which varies the delivery of a fuel pump by introducing correction factors which modify said delivery, in order to compensate the fuel flow to the engine for variations in the pressure and temperature of the air entering the engine. However, we have found that better control of engine operation can be obtained by providing a fuel control system in which the maximum fuel flow to the engine is regulated in terms of the quantities "corrected fuel flow" and "corrected engine speed," as defined hereinbelow, whereby inlet air temperature and pressure compensation of the fuel flow to the engine is inherent in the system, and hence in the sense that no additional correction factors are required to compensate for such changing operating conditions.

What we mean by the term "inherent," as applied herein to compensation of the fuel flow for changing operating conditions, such as: engine speed (r.p.m.), and inlet air temperature and pressure, will be understood from the following explanation:

(1) In prior art aircraft engine controls, the fuel flow to the engine ($W_f$) is usually metered as a function of engine speed (r.p.m.) and additive corrections are then applied to correct said fuel flow for air temperature and pressure variations. This can, at best, give only an approximation to the required control properties. On the other hand, in our invention, we provide means for measuring engine speed (N) and inlet air temperature ($T_1$), and a device that mechanically and automatically computes the value of the ratio ($N/\sqrt{T_1}$). We further provide another means for measuring inlet air temperature ($T_1$) and pressure ($P_1$), and a second device that mechanically and automatically computes the quantity ($W_f/(P_1\sqrt{T_1})$). We then provide a third device that is responsive to the thus computed values of $N/\sqrt{T_1}$ and $W_f/(P_1\sqrt{T_1})$ and mechanically and automatically regulates the computed quantity ($W_f/(P_1\sqrt{T_1})$), as a selected function ($f$) of corrected speed ($N/\sqrt{T_1}$), thus obtaining the relationship between "corrected fuel flow" ($W_f/(P\sqrt{T_1})$) and "corrected speed" ($N/\sqrt{T_1}$) that is required by any particular engine to prevent the fuel flow from exceeding a rate that might cause engine damage due to compressor instability.

(2) In brief, our invention comprises a combination of mechanisms which is inherently (i.e., mechanically and automatically) capable of performing the calculations of multiplication, division, and evolution, that are required to produce the relation necessary for the proper operation of the engine, viz.:

$$W_f/(P\sqrt{T_1}) = (f)(N/\sqrt{T_1})$$

that is to say, "corrected fuel flow," $W_f/(P\sqrt{T_1})$, is a selected function ($f$) of "corrected speed," $N/\sqrt{T_1}$, and no additional correction factors have to be applied to the fuel flow to compensate for changes in said air temperature and pressure as in prior art controls.

An arbitrary temperature scale, in units of 518.4° F., and an arbitrary pressure scale, in units of one sea level atmosphere, are generally used in plotting the characteristics of a jet engine. When this is done, the values of "corrected speed," "corrected air flow," etc., have, in a sense, been "corrected" to standard sea level conditions.

Now when the engine properties are plotted in terms of actual speed (r.p.m.), actual fuel flow, actual air flow, etc., there results a multiplicity of curves, corresponding to each operating condition of speed, temperature and pressure. Each family of curves can be plotted up (e.g.), maximum fuel flow vs. speed (r.p.m.), keeping $P_1$ constant, which then becomes a "parameter" for that family of curves.

In the aircraft engine art, a loose mode of expression has become well established, in which the "corrected" values of speed, fuel flow, etc., are themselves, referred to as "control parameters." Strictly speaking, this terminology is not used in its rigid mathematical sense, but it is so common and well understood by those skilled in the art, that we shall adhere to it, and refer to the quantities "corrected speed" and "corrected fuel flow," as "control parameters."

The objects of this invention are to provide an improved control system for turbo-jet engines embodying the following features.

A fully hydraulic control apparatus in which an inlet air pressure and temperature compensation of the fuel flow to the engine is inherent in the automatic operation of the apparatus, and additional correction factors for these variables are not required to compensate for such changing operating conditions.

A fully hydraulic control apparatus which accurately computes and uses as control "parameters," for limiting the maximum fuel flow to the engine, the quantities "corrected speed" and "corrected fuel flow," as defined hereinbelow.

A control apparatus which comprises a device that measures inlet air absolute temperature and engine speed (r.p.m.) and puts out an hydraulic pressure which is a function of said speed, divided by the square root of said hydraulic temperature; said pressure being applied to position a main fuel metering valve.

A control apparatus comprising, in a single self-contained package, a plurality of component coordinated hydraulic devices for regulating fuel delivery to the engine; said devices being collectively responsive to a single manual control, to inlet air pressure and temperature, and to speed of the engine.

A control system apparatus wherein the fuel regulating mechanism operates in its own fluid (which may be either an oil or engine fuel), and acts directly on the fuel supplied by a constant delivery pump and regulates its flow to the engine by means of a plurality suitably controlled by-pass valves.

A control apparatus which produces a substantially constant engine speed, corresponding to the selected position of a single manual control lever, under all engine operating conditions.

A control apparatus which functions so that the engine can be accelerated and decelerated at a maximum rate, corresponding respectively to the temperature of the air entering the engine compressor, and to the minimum fuel flow corresponding to burner blowout conditions. In addition, the fuel flow is never great enough to cause stalling of the compressor.

A control apparatus wherein the fuel flow to the engine is varied by:

(1) A metering orifice whose area is varied in accordance with the ratio of engine speed to the square root of the inlet air temperature; and (2) A metering head across said orifice which:

(a) During engine acceleration, varies in accordance with the pressure and temperature of the air entering the engine compressor;

(b) During steady state engine operation, is controlled by a centrifugal speed governor geared to the engine, whose action is responsive to the position of a manual control lever; and (c) During engine deceleration, is controlled by said governor, whose action is modified by the temperature of the air entering the engine compressor.

A control apparatus having thermal control devices which vary the fuel flow in accordance with variations in temperature and pressure of the ambient atmosphere, to prevent compressor stall and hence engine failure at high altitudes and low atmospheric temperatures.

With these and other objects in view which may be incident to our improvements, our invention consists in the combination and arrangement of elements hereinafter described and illustrated in the accompanying drawings, in which:

Figure 2 shows, also somewhat diagrammatically, a control apparatus embodying the principles of our invention.

Figure 1:
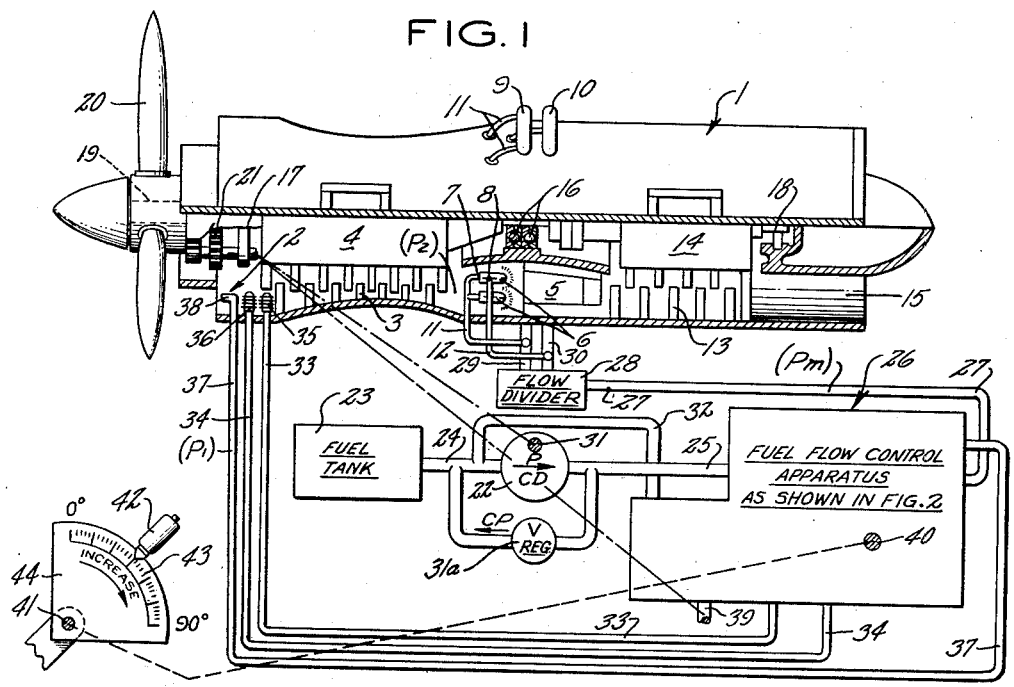
Figure 1 shows, somewhat diagrammatically, an engine suitable for propeller-and-jet propulsion of aircraft, with its associated fuel control apparatus, operating in conjunction with a constant displacement fuel pump and a manual control lever, and the principal connections therebetween.

The control system herein disclosed is fully hydraulic and uses, as control "parameters" for limiting the maximum fuel flow to the engine, the quantities "corrected engine speed" and "corrected fuel flow," which are respectively defined as:

Actual engine revolutions per minute (N), divided by the square root of the engine air inlet absolute temperature ($T_1$), i.e., $N/\sqrt{T_1}$; and The fuel flow to the engine ($W_f$), divided by the engine inlet air absolute, total pressure ($P_1$) times the square root of the temperature $T_1$, i.e., $W_f/(P_1\sqrt{T_1})$.

By using these quantities (corrected speed and corrected fuel flow), the altitude and atmospheric temperature compensation of fuel flow to the engine is inherent in the system, and additional correction factors are not required to compensate for such changing operating conditions, as in turbo-jet engine fuel control systems heretofore employed.

The basic philosophy of the fuel control system according to our invention is shown in the following overall analysis.

The maximum fuel flow to a turbo-jet engine is limited by the permissible compressor ratio that results, at any engine speed N, inlet air temperature $T_1$, and inlet air pressure $P_1$, from that fuel flow $W_f$. Since an aircraft turbo-jet engine must operate over a wide range of speeds N, and altitudes, the quantities $P_1$ and $T_1$ are also variable over a very wide range. If, at any conditions of N, $P_1$, and $T_1$ the fuel flow $W_f$ exceeds a certain magnitude, compressor stall results, and the engine becomes inoperative. For a particular engine design, the relation between the permissible fuel flow ($W_f$), engine speed (N), inlet air absolute temperature ($T_1$) and pressure ($P_1$), can be expressed by the relation:

$$\frac{W_f}{(P_1\sqrt{T_1})}=f\left(\frac{N}{\sqrt{T_1}}\right) \qquad (1)$$

The functional relationship ($f$) in Equation (1) can be determined for any particular engine model, as described on pages 14 and 15 below.

One object of the control system herein disclosed is to limit the corrected fuel flow, $W_f/(P_1\sqrt{T_1})$, to the value required for optimum operation of the engine, for each value of $N\sqrt{T_1}$. To achieve this object, the control apparatus measures N and $T_1$, and comprises a "corrected speed computer" which computes the ratio $N/\sqrt{T_1}$. The output of the corrected speed computer is an hydraulic pressure $h_x$, which is a function of $N/\sqrt{T_1}$. This pressure is applied to position a fuel metering valve which is contoured in such a manner, in relation to engine requirements that at any value of $h_x$, the flow area ($A_{mv}$) of the valve is:

$$A_{mv}=f'(h_x)=k_{mv}f(N/\sqrt{T_1}) \qquad (2)$$

where $k_{mv}$ is an empirically determined constant.

A metering pressure ($p_f-p_t$), proportional to $T_1$, is applied across the metering valve, so that the flow through said valve is:

$$W'_f=C'A_{mv}\sqrt{P_f-P_t}$$
$$=C'k_{mv}f(N/\sqrt{T_1})\sqrt{k_tT_1} \qquad (3)$$

where $C'$ is the flow coefficient, and $k_{mv}$ and $k_t$ are empirical constants.

The flow $W_f'$ is then directed through an "inlet pressure multiplier," which directs a fuel flow $W_f$ to the engine, and the remaininr portion ($W_f'-W_f$) of the total fuel flow delivered by a fuel pump is by-passed back to the pump inlet.

As will be shown hereinbelow, the net fuel flow to the engine becomes:

$$W_f = [C_{mv} k_{mv} \sqrt{k_t/A_{vb}}] \times P_1/(P_1)_m \times \sqrt{T_1} \times f(N/\sqrt{T_1})$$
$$[K_1/P_1)_m] \times P_1 \sqrt{T_1} f(N/\sqrt{T_1}) \quad (4)$$

where $C_{mv}$ is the flow coefficient through the metering valve, $A_{vb}$ is the fixed area of a fuel flow by-pass valve (controlled by temperature $T_1$), and $$K_1 = C_{mv} k_{mv} \sqrt{k_t/A_{vb}}$$

The quantities in the brackets are all constants, and by a proper design of the fuel flow control system, the term in the brackets can be made equal to unity, so that the maximum fuel flow that the control system will give is expressible by:

$$\frac{W_f}{P_1 \sqrt{T_1}} = f(N/\sqrt{T_1})$$

which is the same as Equation 1.

Broadly comprehended, our invention comprises a fuel and speed control apparatus for a turbo-jet engine in which a series of coacting, hydraulically-actuated devices are combined in one self-contained package and automatically regulate the delivery of fuel to the engine from a constant delivery fuel pump under all engine operating conditions.

In principle, the fuel flow to the engine is primarily controlled by a main metering valve, whose flow area is varied in accordance with "corrected engine speed," as computed by a corrected speed computer in the control apparatus, and whose metering head is varied:

(a) During engine acceleration, in accordance with the pressure and temperature of the air entering the engine compressor;

(b) During steady state engine operation, by a centrifugal speed governor geared to the engine, whose action is responsive to the position of a manual control lever; and (c) During engine deceleration, by said governor, whose action is modified in accordance with the position of said main metering valve.

The fuel flow to the engine is also secondarily controlled by an air "inlet pressure multiplier" which corrects the metered fuel flow, in accordance with the pressure of the air entering the engine compressor.

Referring now to Figure 1 of the drawings, there are shown, as the principal elements of the engine mentioned above: a supporting casing 1, an air inlet 2, a multistage air compressor 3, a compressor rotor shaft 4, one each of a number of combustion chambers 5; a series of combustion nozzles 6, each having a fixed slot 7 and an auxiliary slot 8, connected respectively to two generally circular fuel manifolds 9 and 10, by means of conduits 11 and 12, a multistage gas turbine 13, a turbine rotor shaft 14, connected to the compressor rotor shaft 4, a tail pipe 15 for discharging exhaust gases from gas turbine 13; a center bearing 16 and end bearings 17 and 18, supported by casing 1; a propeller shaft 19, carrying a propeller 20, and a gear train 21, connecting shafts 4 and 19 for rotating propeller 20 at a speed proportional to engine speed and for operating the fuel pump and other accessories. The construction of a turbo-jet engine used solely for jet propulsion is similar to that of the engine shown in Figure 1, except for the omission of the propeller shaft 19 and corresponding modification of the gear train 21.

A constant displacement fuel pump 22 draws fuel from a supply tank 23 through a conduit 24, which may include a boost pump (not shown), and delivers it through a conduit 25 to the fuel flow control apparatus diagrammatically indicated at 26 and shown in detail in Figure 2. From fuel control apparatus 26, the fuel flows through a conduit 27 to a pressure-responsive flow-divider 28, and from thence through conduits 29 and 30 to fuel manifolds 9 and 10, respectively, in the engine. Pump 22 is operated by a drive shaft 31 connected to gear train 21 in the engine, or to any other suitable source of power and is provided with a by-pass having a maximum pressure regulating valve 31a to insure that the pump discharge pressure never exceeds a selected safe value, which is always higher than the highest operating discharge pressure of pump 31. The fuel control apparatus 26 acts to vary the quantity of fuel delivered to the engine per unit of time, as required by the operating conditions, and the difference between the fuel delivered by the pump 22 and the quantity required by the engine is by-passed through a plurality of relief valves in the fuel control apparatus 26 and returns to the inlet side of the pump through conduit 32.

In each of the combustion nozzles 6 there is a series of fixed slots, one of which is indicated at 7, through which fuel enters the nozzles 6 from conduit 11. The fuel flow from the nozzles is directly proportional to the effective area of slots 7 and is a square root function of the drop across the nozzles between the pressure in conduit 11, which is substantially equal to the pressure $(p_m)$ in conduit 29, and the pressure $(p_2)$ in the combustion chamber 5. As it is desired to limit the range of fuel pressures so that their value at maximum fuel flow is less than that corresponding to the square root function of the drop across slots 7, the nozzles 6 are provided with auxiliary slots 8 supplied by manifold 12 connected to the pressure-responsive flow-divider 28 which opens at a predetermined value of the pressure $(p_m)$ in conduit 27. In this manner, the pressure $(p_m)$ may be maintained sufficiently high to produce satisfactory nozzle discharge without requiring the fuel regulator 26 and pump 22 to operate under unfavorable pressure conditions at maximum flow.

The fuel flow control apparatus indicated as 26 in Figure 1, and shown diagrammatically in Figure 2, is connected by conduits 33 and 34 respectively to bulbs 35 and 36, each of which contains an expansible fluid responsive to the temperature of the air entering the compressor 3 through air inlet 2. Control apparatus 26 is also connected by a conduit 37 to a Pitot tube 38, located in air inlet 2, which measures the total pressure of the air entering inlet 2. As subsequently explained, the fuel control apparatus 26 is responsive to the inlet air (ambient atmospheric) absolute temperature $(T_1)$ and to the absolute total pressure of the inlet air.

A main drive shaft 39 in fuel control apparatus 26 is driven by the engine at a speed proportional to engine speed and a manual control shaft 40 is rotated in response to movement of a shaft 41 to which is fixed the engine control lever 42. Control lever 42 is manually operable in reference to a scale 43 on a fixed quadrant 44, the scale 43 being calibrated in terms of engine speed (r.p.m.).

Referring to Figure 2, there is shown, somewhat diagrammatically, an embodiment of our invention, indicated by the reference numeral 26 in Figure 1, all the elements of which are enclosed in a casing 45 which is connected by conduits 33 and 34 to temperature bulbs 35 and 36 in air inlet 2, and by conduit 37 to Pitot tube 38 for supplying air to the control apparatus at inlet air total pressure $(P_1)$. The control apparatus shown in Figure 2 is a self-contained hydraulic system employing the interior of casing 45 as a reservoir 46 which is maintained approximately full of liquid at a pressure $(h_o)$, in order to permit the working elements to operate in a lubricating path.

Hydraulic pressure for operating the mechanisms contained in casing 45 is furnished by a constant displacement pump 47, which is driven by the engine through shaft 39 and gear train 21, and draws the operating liquid from reservoir 46. The discharge pressure $(h_c)$ of pump 47 is maintained at a selected value by a relief valve 48, biased towards closed position by a spring 49, whose compression is adjustable by means of a set screw 50. When the pump discharge pressure $(h_c)$ exceeds the setting of spring 49, valve 50 opens and permits liquid to escape through outlet 51 back into reservoir 46.

Liquid discharged by pump 47 and not by-passed through valve 48 to reservoir 46, passes through a restriction 52 and conduit 53 to a hydraulically balanced pressure regulating valve 54, which is slidably mounted in a chamber 55 and is connected to the movable upper end of an expansible bellows 56, the interior of which is connected by conduit 33 to temperature bulb 35 in air inlet 2. Bellows 56, conduit 33, and bulb 35 are filled with a liquid having a suitable coefficient of thermal expansion, such that the linear displacement of valve 55 is a definite function of the absolute temperature ($T_1$) of the air entering the compressor 3, through air inlet 2.

The liquid passing through valve 54, is reduced to a regulated pressure ($h_x$), and is conducted by a conduit 57 to a chamber 58, wherein a piston 59 is slidably mounted and connected by a stem 60 to a centrifugal speed device 61, whose shaft 39 is connected to the engine through gear train 21. Device 61 comprises a disc 63, integral with shaft 39, having a pair of lugs 64 to which are pivotally attached a pair of flyweight arms 65, and are arranged to engage the stem 60, so that the upward force acting on piston 59 is proportional to the square of the engine speed N. The upper part of chamber 58 above piston 59 is connected through a conduit 66 with conduit 53, and is provided with a port 67 which is varied by the position of piston 59 and communicates with reservoir 46, so that the value of pressure ($h_1$) in conduit 53 depends upon the position of piston 59 with respect to port 67.

*Corrected speed computer*

The above described mechanism 53—67 constitutes the "corrected speed computer" of our control apparatus whose operation is as follows:

The upward force exerted by fly-weights 65 on piston 59 is $k_n N^2$, where $k_n$ is an empirical constant, and N is engine speed (r.p.m.). The downward force acting on piston 59 is the pressure differential ($h_1-h_x$) times the area $A_p$ of piston 59. Since these forces balance each other, $$(h_1-h_x)=(k_n/A_p)N^2 \tag{5}$$

The oil-filled temperature bulb 35 is exposed to the inlet air absolute temperature $T_1$ and the variation in the volume of the oil therein, with changing temperature $T_1$, is reflected as a linear displacement ($x$) of the valve 54, so that $$x=x_0+\alpha T_1$$

By choosing $x=0$, when $T_1=0$ (absolute zero), we have $x_0=0$, and $x=\alpha T_1$. The valve 54 is so contoured that the flow area therethrough is:

$$A_{tv}=\text{constant}/\sqrt{T_1} \tag{6}$$

Then the liquid flow through valve 54 is:

$$Q=CA_{tv}\sqrt{h_1-h_x}$$

and using Equations 5 and 6, we get $$Q=C\times\text{constant}/\sqrt{T_1}\times\sqrt{(k_n/A_p)N^2}$$
$$=N/\sqrt{T_1}[C\times\text{constant}\sqrt{k_n/A_p}]$$
$$Q=k_1N/\sqrt{T_1} \tag{7}$$

We measure the flow Q to get a measure of ($N/\sqrt{T_1}$), which is done by permitting the flow Q to pass through a small fixed orifice 68, into the reservoir 46; said orifice being connected to chamber 58 by conduits 69 and 70. The pressure drop across orifice 68 is ($h_x-h_o$), so that:

$$Q=k_1N/\sqrt{T_1}=C_{A1}A_1\sqrt{h_x-h_o} \tag{8}$$

or $$(h_x-h_o)=k_2(N/\sqrt{T_1})^2$$

where $C_{A1}$ is the discharge coefficient, and $A_1$ is the area of the orifice 68, and $k_2$ is an empirical constant. Thus, the pressure differential ($h_x-h_o$), being equal to a constant ($k_2$) times the square of the "corrected speed" ($N/\sqrt{T_1}$), is a measure (though not linear) of the "corrected speed" ($N/\sqrt{T_1}$).

*Fuel metering valve area*

Conduit 69 is connected to a cylinder 71, wherein is slidably mounted a piston 72, connected by a rod 73, to an hydraulically balanced, fuel metering valve 74, which operates in a valve chamber 75. A spring 76 is mounted between piston 72 and the right end of cylinder 71, which opens into reservoir 46. By this arrangement, the pressure differential ($h_x-h_o$) acts on piston 72 and valve 74, and since the latter is balanced against fuel pressure reactions its travel ($z$) from closed position is such that:

$$k_{sm}z=(h_x-h_o)A_{pm}$$

where $k_{sm}$ is the rate of spring 76 and $A_{pm}$ is the fixed area of piston 72.

$$z=\frac{A_{pm}}{k_{sm}}(h_x-h_o)$$

and using Equation 8 we get $$z=\frac{A_{pm}\cdot k_2}{k_{sm}}(N/\sqrt{T_1})^2 \tag{9}$$

Figure 3:
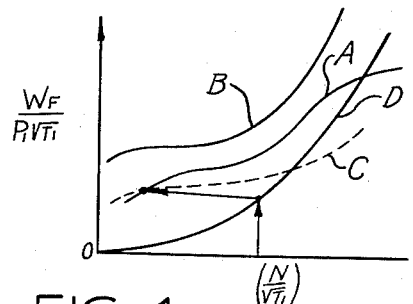
Figures 3 to 5, inclusive, are diagrams showing the operating characteristics of various components of the apparatus shown in Figure 2.

Referring now to Figure 3, the curve A shows the functional relationship ($f$) between "corrected speed" ($N/\sqrt{T_1}$) and "corrected fuel flow," $W_f/(P_1\sqrt{T_1})$, which relationship can be determined for any particular engine model. In order to determine the permissible actual fuel flow as a function of ($N/\sqrt{T_1}$), at a value of $P_1=(P_1)_m$, the maximum inlet air pressure that can be encountered in practice (say it might be 25 pounds per square inch (p.s.i.) at sea level and high speed of flight), we replot curve A of Fig. 3; and using a normal value of 520° R for $T_1$, we get a curve as shown at B in Fig. 3. Superposing on curve B a plot of Equation 9, we get the fuel flow $W_f$ and the travel $z$ of the valve 74 from closed position, in terms of corrected speed $N/\sqrt{T_1}$. Remembering from column 4, lines 63–69, that we are going to make the fuel metering pressure differential ($p_f-p_i$) proportional to $T_1$, we assign a value of this pressure differential to apply at $T_1=520°$ R. Then the flow area ($A_{mv}$) of metering valve 74 is:

$$A_{mv}=\frac{W_f}{C_{mv}\sqrt{(p_f-p_i)_{520°}}} \tag{10}$$

Figure 4:
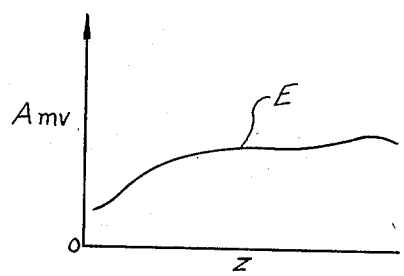

And we plot this, as indicated by the curve C in Fig. 3. We next plot Equation 9, as shown by curve D in Fig. 3. We then have a relation between $z$ and $A_{mv}$, as indicated by curve E in Fig. 4, which enables us to contour the valve 74 so as to suit the curve A in Fig. 3. By this procedure we obtain a system that gives:

$$A_{mv}=k_{mv}[f(N/\sqrt{T_1})] \tag{11}$$

*Fuel metering pressure*

Fuel from pump 22 (Fig. 1), enters fuel control apparatus 26 through conduit 25, under a pressure $p_f'$, and flows through a conduit 77, and past a check valve 78, into metering valve chamber 75. Valve 78 is urged toward closed position by a spring 79 whose rate determines the pressure drop across said valve. Fuel from conduit 77 also flows through a conduit 80 into a chamber 81, wherein is slidably mounted a piston by-pass valve 82 which regulates the opening of a port 83 through which said fuel may escape and return, through conduits 84 and 32, to the inlet side of pump 22.

The lower end of chamber 81 below piston 82 is connected through conduits 85 and 86 and a restriction 87 to conduit 77, and a spring 88 in chamber 81 biases piston valve 82 upward toward closed position. A conduit 89 connects conduits 85 and 86 with a chamber 90, wherein is mounted a valve 91 which is attached by its stem to the movable upper end 92 of an expansible bellows 93 which biases valve 91 toward closed position. The interior of bellows 93 is connected by conduit 34 to temperature bulb 36 in air inlet 2 (Fig. 1). Bulb 36 is filled with a gas having a suitable coefficient of thermal expansion so that the force acting upward on the movable upper end 92 of bellows 93 is proportional to the absolute temperature of the air entering compressor 3 through an inlet 2 (Fig. 1). Chamber 90 is connected through a conduit 94 to a conduit 95 through which the metered fuel is discharged from chamber 75, under a pressure (pi).

Conduits 85, 86 and 89 are connected by a conduit 96 to a speed governor 97 whose function and operation will be further described hereinbelow. Assuming that the speed governor 97 is in its cut-out position, as shown in Fig. 2, the control pressure $p_c$, in conduits 85, 86, 89, 96 and in chamber 81 below piston 82, is determined by the opening of valve 91 in relation to the fixed area of restriction 87; that is, the more valve 91 opens, with a decrease in inlet air temperature $T_1$, the lower will be the control pressure $p_c$.

The equilibrium of by-pass valve 82 is given by:

$$(p_f' - p_c) = F_{b1}/A_b$$

(Force of spring 88/area of piston 82)　　　(12)

The force acting upward on valve 91 is proportional to the absolute temperature $T_1$ of the inlet air, while the force acting downward on valve 91 is the pressure differential $(p_c - p_i)$ acting thereon, so that $$(p_c - p_i) = k_t T_1 / A_{bv}　　　(13)$$

where $k_t$ is an empirical constant.

Equilibrium of the check valve 78 is:

$$(p_f' - p_f) = F_{cs}/A_{cs}　　　(14)$$

where $F_{cs}$ is the force of spring 79 and $A_{cs}$ is the flow area through valve 78.

Multiplying Equation 14 by $-1$ and then adding it to Equations 12 and 13, we get:

$$-p_f' + p_f + p_f' - p_c + p_c - p_i = -F_{cs}/A_c + F_{b1}/A_b + k_t T_1/A_{vb}$$
$$= (p_f - p_i)$$

where $A_c$ denotes the area of the face of valve 78 which is exposed to $(p_f - p_f)$. And if we make $$F_{cs}/A_c = F_{b1}/A_b$$

we get $$(p_f - p_i) = (k_t/A_{vb})T_1　　　(15)$$

Since $(p_f - p_i)$ is the pressure drop across the main metering valve 74, the flow through said valve is:

$$W_f' = C_{mv}A_{mv}\sqrt{p_f - p_i}$$
$$= C_{mv}k_{mv}[f(N/\sqrt{T_1})]\sqrt{(k_t/A_{vb})T_1}$$
$$= K_1\sqrt{T_1}f(N/\sqrt{T_1})　　　(16)$$

where $C_{mv}$ is the flow coefficient, and $A_{mv}$ the flow area, through the metering valve 74, and $K_1$ is an empirical constant equal to $C_{mv}k_{mv}\sqrt{(k_t/A_{vb})}$.

Inlet pressure multiplier

From metering valve 74, the metered fuel flow through conduit 95 to a cylinder 98 in which is slidably mounted a double spool valve 99, having an upper land 100, and a lower land 101, which respectively vary the areas of ports 102 and 103. Valve 99 and lands 100, 101 are so designed that the sum of the flow areas, $A_{v1}$ and $A_{v2}$, through ports 102 and 103, respectively, is constant, that is:

$$(A_{v1} + A_{v2}) = \text{constant}$$

Valve 99 is attached by a stem 104 to the movable lower end 105 of an expansible bellows 106 which is housed in an air-tight chamber 107, connected through conduit 37 with Pitot tube 38 in air inlet 2 (Fig. 1). The pressure in chamber 107 is the absolute total pressure $(P_1)$ of the air entering compressor 3 through inlet 2, while the interior of bellows 106 is evacuated to zero pressure. Valve 99 and lands 100, 101 are so designed that when $P_1$ has its maximum value $(P_1)_m$, $$A_{v1} = (A_{v1})_{max.}$$
$$A_{v2} = 0$$

Figure 5:
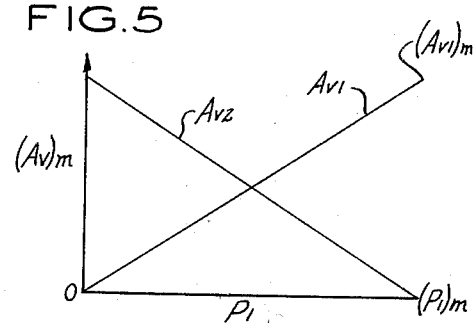

The relation between $P_1$ and the flow areas $A_{v1}$ and $A_{v2}$ is then as shown in Fig. 5.

The fuel passing port 102, flows under a pressure of $P_m$ through conduit 27 to the engine (Fig. 1), while the fuel passing port 103 flows under a pressure $p_x (= p_m)$ through a conduit 108 to a chamber 109, wherein is slidably mounted a piston by-pass valve 110, which varies a port 111 through which fuel returns via conduits 112 and 32 to the inlet side of pump 22. A spring 113 in chamber 109, biases valve 110 toward closed position.

A negligible fraction of the fuel passing through port 102 flows through a small pipe 114 to a chamber 115, wherein is mounted a ball valve 116, which is biased toward closed position by a spring 117 whose compression is adjustable by a set screw 118. From chamber 115, the fuel flows under a pressure $p_c'$ through pipes 119 and 120 into the lower end of chamber 109, where it acts on the underside of piston 110 to supplement the force of spring 113. A pipe 121, having a very small restriction 122, connects pipe 119 with conduit 112, and permits a small fraction of the fuel flow from chamber 115 to escape into return conduit 112, so as to maintain a desired pressure differential across piston 110.

The above described mechanism comprising elements 98—122 constitutes the "Inlet pressure multiplier," whose function and operation is as follows.

Equilibrium of the by-pass valve 110 and of valve 116 is given respectively by:

$$p_x - p_c' = F_{b2}/A_{b2}$$
$$p_m - p_c' = F_{s2}/A_{c2}$$

where $A_{b2}$ is the area of face of valve 110, $F_{b2}$ is the force of spring 113, $A_{c2}$ is the effective area of valve 116, and $F_{s2}$ is the force of spring 117.

We design the system so that $$F_{b2}/A_{b2} = F_{s2}/A_{c2}$$

and then $$p_x = p_m　　　(17)$$

The flow through $A_{v1}$ is:

$$W_f = CA_{v1}\sqrt{p_i - p_m}　　　(18)$$

and through $A_{v2}$ is:

$$W_f' - W_f = CA_{v2}\sqrt{p_i - p_m}　　　(19)$$

From the curves in Fig. 5:

$$A_{v1} = (A_{v1})_m P_1/(P_1)_m　　　(20)$$
$$A_{v2} = (A_{v2})_m - (A_{v2})_m P_1/(P_1)_m$$

or since we design the valve 99 so that $(A_{v2})_m = (A_{v1})_m$, $$A_{v2} = (A_{v1})_m - (A_{v1})_m P_1/(P_1)_m　　　(21)$$

Eliminating $(p_i - p_m)$ from Equations 18 and 19, we get:

$$W_f' - W_f = W_f(A_{v2}/A_{v1})　　　(22)$$

and using Equations 20 and 21 in Equation 22, we get:

$$W_f' = W_f\left\{\frac{(A_{v2})_m(1 - (P_1/(P_1)_m))}{(A_{v1})_m(P_1/(P_1)_m)} + 1\right\}　　　(23)$$

If the control apparatus is designed so that $$(A_{v2})_m = (A_{v1})_m$$

Equation 23 becomes:

$$W_f' = W_f(P_1)_m/(P_1)$$

or $$W_f = W_f' P_1/(P_1)_m　　　(24)$$

$W_f'$ is given by Equation 16, column 10, and substituting this Equation 24, we get:

$$W_f = P_1 k_1 \sqrt{T_1}/(P_1)_m f(N/\sqrt{T_1})$$

or $$W_f/(P_1\sqrt{T_1}) = \frac{k_1}{(P_1)_m} f(N/\sqrt{T_1}) \qquad (25)$$

When the control apparatus is designed so as to make $k_1/(P_1)_m = 1.0$ then Equation 25 shows that the specified relation between "corrected fuel flow" and "corrected speed" is produced.

Speed governing

The speed governor 97 shown in Fig. 2, comprises a fixed sleeve 123 in which is slidably mounted a spool valve 124 with a land 125, which varies the area of the outlet of connecting conduit 96. Valve 124 is connected by a stem 126 to a disc 127 which contacts the inner ends of a pair of flyweights 128, pivotally connected to a disc 129 which is integral with a shaft 130 that is driven by the engine through shaft 39 and gear train 21 (Fig. 1). The upward thrust of flyweights 128 on valve 124 is opposed by the downward force of a spring 140 whose compression is varied by a cam 141, adjustably attached by a set screw 142 to shaft 40, which is rotated by shaft 41 upon movement of manual control lever 42 (Fig. 1).

Sleeve 123 is connected by a conduit 131 to a chamber 132, wherein is slidably mounted a valve 133 which is biased toward closed position by a spring 134 whose compression is varied by a disc 135, slidably mounted in chamber 132. Disc 135 has a stem 136, pivotally connected to an arm 137 which is adjustably attached by a collar and set screw 138 to the rod connecting piston 72 to the fuel metering valve 74. Chamber 132 is connected to conduit 95 by a pipe 139, so that fuel passing valve 133 flows into said conduit. Elements 131—139 constitute the "deceleration metering device" whose function and operation is described hereinbelow.

The control apparatus, as described above (exclusive of speed governor 97) controls the maximum fuel flow to the engine, and the speed governing system will now be described.

Steady state operation

When the manual control lever 42 is set at any point on scale 43 of quadrant 44 (Fig. 1), cam 141 produces a compression of spring 140 which is balanced by the upward thrust of flyweights 128, when the engine is running at a speed (r.p.m.), corresponding to that indicated on scale 43 by the position of the manual control lever 42. In this balanced position, valve 125 opens the outlet of 96 just enough to create a value of the control pressure $p_c$, acting on piston valve 82, to produce a pressure $p_f'$ in conduit 77, such that the pressure differential $(p_f - p_i)$ across the metering valve 74 causes the proper rate of fuel flow to the engine to maintain the selected speed. This is the condition of steady state operation.

Acceleration

If now, it is desired to accelerate the engine to a higher speed, the manual control lever is advanced (to the right) on scale 43, whereupon cam 141 increases the compression of spring 140 to a value exceeding the upward thrust of flyweights 128, so that valve 125 moves down and momentarily closes the outlet of conduit 96. This causes a rise in the control pressure $p_c$ which increases the pressure differential $(p_f - p_i)$ across the metering valve 74 and therefore an increase in fuel flow to the engine which produces the desired increase in speed. When the higher selected speed is attained by the engine, the increased upward thrust of flyweights 128 moves valve 125 upward until a new position of equilibrium is established, whereupon the engine operates at the selected higher speed in a steady state condition.

Deceleration

Conversely, a movement of the manual control lever 42 to the left on scale 43 causes a reverse operation of the mechanism just described and reduces the speed of the engine to the new selected value indicated on scale 43. However, a too rapid deceleration of the engine may cause such a large reduction in the fuel flow to the engine as to extinguish combustion in chamber 5 (Fig. 1). Since this condition, known as "burner blowout" causes a failure of the engine, special precautions are needed to prevent such an occurrence. This is achieved in our control apparatus by the "deceleration metering device" (131—139), described above, which operates as follows.

A rapid reduction of the compression of spring 140 by a sudden retardation of manual control lever 42, causes the speed governor valve 125 to fully open the outlet from conduit 96, whereupon the control pressure $p_c$ drops to a value limited by the rate at which fuel escapes past valve 133. In order to prevent such an excessive drop in the control pressure $p_c$, and hence metering pressure differential $(p_f - p_i)$, as may cause "burner blowout," the opening of valve 133 is regulated by the compression of spring 134 which is varied in accordance with the position of metering valve 74, by virtue of the connecting elements 135—138, so that any movement of valve 74, say to the right (increasing fuel flow), causes an increase in the force of spring 134, which reduces the opening of valve 133 and thus limits the fall in the control pressure $p_c$ and fuel metering pressure differential $(p_f - p_i)$ to a value sufficient to maintain combustion and thus prevent "burner blowout."

As shown by Equation 5 on column 7, line 40, the pressure differential $(h_1 - h_x)$, in the corrected speed computer, is proportional to the square of engine speed, that is:

$$(h_1 - h_x) \alpha N^2$$

Since the discharge pressure of a centrifugal pump varies as the square of its speed, the pressure differential across such a pump could be used in lieu of the arrangement shown in Figure 2, as a component of the corrected speed computer. However, the arrangement shown in Figure 2 is more reliable in action, and is therefore preferred. It is also to be understood that in some of the mechanisms shown in Figure 1, it might be desirable to interpose power amplifiers to eliminate frictional effects, and other refinements and variations are possible without departing from the basic principles of our invention, as herein disclosed.

Accordingly, while we have shown and described the preferred embodiment of our invention, we desire it to be understood that we do not limit ourselves to the particular details of construction and arrangement of elements disclosed by way of illustration, as these may be changed and modified by those skilled in the art without departing from the spirit of our invention or exceeding the scope of the appended claims.

We claim:

1. A fuel and speed control apparatus for an internal combustion engine having a pump for supplying fuel thereto, comprising: an orifice for metering the fuel flow ($W_t$) from said pump to said engine; first means, responsive to N and $T_1$, for automatically varying the flow area through said orifice, in accordance with a variable function ($f$) of the ratio, $N/\sqrt{T_1}$; second means, responsive to $T_1$, for varying the pressure differential across said orifice in accordance with $\sqrt{T_1}$, whereby the fuel flow through said orifice ($W_t'$) varies in accordance with the quantity $\sqrt{T_1} f(N/\sqrt{T_1})$; and third means, responsive to $P_1$, for modifying said last-mentioned fuel flow ($W_t'$), so as to cause the fuel flow ($W_t$) to said engine to vary in accordance with the equation:

$$W_t = P_1 \sqrt{T_1} f(N/\sqrt{T_1})$$

wherein:

$W_f$ is the rate of fuel flow to the engine,
$P_1$ is the absolute total unit pressure of the air entering the engine;
$T_1$ is the absolute temperature of said air;
N is the rotational speed (r.p.m.) of the engine; and
(f) is an empirically determined function, depending upon the design of the engine, and which produces a fuel flow ($W_f$) that obtains maximum safe engine acceleration, under the prevailing engine operating conditions.

2. A control apparatus according to claim 1, wherein said first means includes a metering valve whose position with respect to said orifice is varied in accordance with varying values of the ratio $(N/\sqrt{T_1})$.

3. A control apparatus according to claim 1, wherein said first means includes a device for automatically computing the ratio $N/\sqrt{T_1}$, in terms of a hydraulic control pressure, and means for positioning said valve in accordance with said control pressure.

4. A control apparatus according to claim 2, including means for modifying the fuel flow ($W_f'$) downstream of said valve in accordance with varying values of $P_1$.

5. A fuel and speed control apparatus according to claim 1, which includes a conduit for delivering fuel from said pump to said orifice, a by-pass passage connecting said conduit to the inlet of said pump, and a valve in said passage for regulating the pressure in said conduit.

6. A control apparatus according to claim 5, wherein said regulating valve is influenced by a control pressure which varies in accordance with varying values of $T_1$.

7. A control apparatus according to claim 5, wherein said regulating valve is also influenced by a control pressure which varies in accordance with engine speed (N), during engine steady state operation.

8. A control apparatus according to claim 5, wherein said regulating valve is also influenced by a control pressure which varies in accordance with the position of a manual control lever.

9. A fuel and speed control apparatus according to claim 1, wherein said third means includes a delivery conduit for delivering fuel from said orifice to the engine, and a valve connected to said conduit for modifying the fuel flow in said conduit, in accordance with varying values of $P_1$.

10. The combination of a control apparatus according to claim 2, and a turbojet engine having an incorporated air compressor, and a pump for supplying fuel to said engine; wherein said valve is contoured so as to vary the flow area therethrough in accordance with a variable function (f) of the ratio, $N/\sqrt{T_1}$, where said function (f) is empirically determined to produce a fuel flow ($W_f$) that obtains maximum engine acceleration without encountering compressor stall.

References Cited in the file of this patent

UNITED STATES PATENTS

| | | |
|---|---|---|
| 2,457,595 | Orr | Dec. 28, 1948 |
| 2,503,048 | Ifield | Apr. 4, 1950 |
| 2,545,698 | Holley et al. | Mar. 20, 1951 |
| 2,557,526 | Bobier et al. | June 19, 1951 |
| 2,564,127 | Orr | Aug. 14, 1951 |
| 2,581,275 | Mock | Jan. 1, 1952 |
| 2,596,815 | Keil | May 13, 1952 |
| 2,604,149 | Wynne | July 22, 1952 |
| 2,618,927 | Chandler | Nov. 25, 1952 |
| 2,638,739 | Barr | May 19, 1953 |
| 2,638,742 | Carey | May 19, 1953 |
| 2,644,513 | Mock | July 7, 1953 |
| 2,668,585 | Oestrich et al. | Feb. 9, 1954 |
| 2,720,751 | Kunz | Oct. 18, 1955 |
| 2,779,422 | Dolza et al. | Jan. 29, 1957 |

FOREIGN PATENTS

| | | |
|---|---|---|
| 992,396 | France | July 11, 1951 |
| 580,149 | Great Britain | Aug. 8, 1946 |

OTHER REFERENCES

Article "Gas Turbine Fuel Systems," by W. A. Andrews in Flight, October 20, 1949, at pages 512–514.

Bulletin "Gas Turbine Engine Governing," No. 40004B, published by Woodward Governor Co. Rockford, Ill., November 1955, pages 9, 10 and 11.

Publication (book) Aircraft Jet Powerplants by Franklin P. Durham, published by Prentice-Hall, Inc., New York, N.Y., 1951, pages 128 through 131.